United States Patent
Schwalbe et al.

(10) Patent No.: US 7,941,581 B2
(45) Date of Patent: May 10, 2011

(54) METHOD FOR INTEGRATING DEVICE-OBJECTS INTO AN OBJECT-BASED MANAGEMENT SYSTEM, OR CONFIGURATION SYSTEM, FOR FIELD DEVICES IN AUTOMATION TECHNOLOGY, WHICH STORES UPDATED DEVICE OBJECTS, ACTIVATES A PROGRAM FOR ACCESSING THE STORED DATE AND STARTING A DIALOG FOR INVOKING A SELECTED NUMBER OF UPDATED DEVICE-OBJECTS

(75) Inventors: Alexander Schwalbe, Pforzheim (DE); Thomas Bednasch, Mannheim (DE)

(73) Assignee: CodeWrights GmbH, Karlsruhe (DE)

(*) Notice: Subject to any disclaimer, the term of this patent is extended or adjusted under 35 U.S.C. 154(b) by 164 days.

(21) Appl. No.: 12/314,103

(22) Filed: Dec. 4, 2008

(65) Prior Publication Data
US 2009/0157925 A1 Jun. 18, 2009

(30) Foreign Application Priority Data
Dec. 4, 2007 (DE) .................. 10 2007 058 606

(51) Int. Cl.
G06F 13/42 (2006.01)

(52) U.S. Cl. .................................... 710/105; 710/104

(58) Field of Classification Search .......... 710/104–110, 710/300–315; 709/220–223
See application file for complete search history.

(56) References Cited

U.S. PATENT DOCUMENTS

| | | | |
|---|---|---|---|
| 7,702,774 B2 * | 4/2010 | Birkhofer et al. | 709/223 |
| 2006/0177125 A1 * | 8/2006 | Chan et al. | 382/154 |
| 2007/0078956 A1 * | 4/2007 | VanGompel | 709/220 |
| 2008/0288613 A1 * | 11/2008 | Birkhofer et al. | 709/220 |
| 2008/0320402 A1 * | 12/2008 | Isenmann et al. | 715/762 |

FOREIGN PATENT DOCUMENTS

| | | |
|---|---|---|
| DE | 10 2005 040 434 A1 | 3/2007 |
| DE | 10 2006 028 361 A1 | 9/2007 |
| DE | 10 2007 058 609 A1 | 7/2008 |
| EP | 1 811 351 A1 | 7/2007 |

OTHER PUBLICATIONS

International Electrotechnical Commission, "Function Blocks (FB) for Process Control—Part 2: Specification of FB Concept", IEC 2006, Switzerland.
FDT/DTM, Wikipedia Jul. 2008.

* cited by examiner

*Primary Examiner* — Raymond N Phan
(74) *Attorney, Agent, or Firm* — Bacon & Thomas, PLLC

(57) ABSTRACT

A method for integration of device-objects in an object-based management system for field devices in automation technology, wherein the device-objects are used for servicing the field devices. Updated device objects or an updated version of a device-objects library, are/is stored on a physical storage medium, wherein the physical storage medium is connected with a control/display unit, on which a predetermined operating system is running, into which a frame application for the device objects is bound. A program is activated, which makes the updated device objects stored on the physical storage medium at least partially accessible on a display unit, as soon as the storage medium is connected with the control/display unit, and wherein, automatically or manually, a dialog is started, with which operating personnel can invoke a selected number of device-objects, and, via the updated device object, or updated device objects, service a corresponding field device, or corresponding field devices.

10 Claims, 4 Drawing Sheets

METHOD FOR INTEGRATING DEVICE-OBJECTS INTO AN OBJECT-BASED MANAGEMENT SYSTEM, OR CONFIGURATION SYSTEM, FOR FIELD DEVICES IN AUTOMATION TECHNOLOGY, WHICH STORES UPDATED DEVICE OBJECTS, ACTIVATES A PROGRAM FOR ACCESSING THE STORED DATE AND STARTING A DIALOG FOR INVOKING A SELECTED NUMBER OF UPDATED DEVICE-OBJECTS

TECHNICAL FIELD

The present invention relates to a method for integrating device-objects or device managers into an object-based management-system, or configuration-system, for field devices in automation technology.

BACKGROUND DISCUSSION

In process, as well as manufacturing, automation technology, field devices are often applied for registering and/or influencing process variables. Serving for registering process variables are measuring devices, such as, for example, fill-level measuring devices, flow measuring devices, pressure- and temperature-measuring devices, pH-measuring devices, conductivity measuring devices, etc., which register corresponding process variables, fill-level, flow, pressure, temperature, pH-value and conductivity, respectively. Serving for influencing process variables are actuators, such as, for example, valves or pumps, via which e.g. flow of a liquid in a pipeline or fill-level of a medium in a container is changed. Field devices include, in principle, all devices, which are applied near to the process and which deliver, or process, process-relevant information. A large number of such field devices are available from the members of the firm, Endress+Hauser.

In modern industrial plants, field devices are, as a rule, connected via bus systems with at least one superordinated unit. Examples of suitable bus systems include the Profibus®, Foundation Fieldbus® and HART® bus systems. Normally, the superordinated unit is a control system or a control unit, such as, for example, a programmable logic controller, i.e. a PLC. The superordinated unit serves for process control, process visualization, and process monitoring, as well as for start-up and servicing of the field devices. Programs, which run independently on superordinated units, include, for example, the operating, or servicing, tools, FieldCare of Endress+Hauser, Pactware, AMS of Fisher-Rosemount, and PDM of Siemens. Operating, or servicing, tools integrated in control-system applications include PCS7 of Siemens, Symphony of ABB and Delta V of Emerson.

Integration of field devices into object-based configuration, or management, systems is accomplished via device descriptions, which enable the superordinated units to recognize and interpret data delivered from the field devices. Device manufacturers provide the device descriptions for each of their field device types, or for each of their field device types in different applications. In order that the field devices can be integrated into different fieldbus systems, furthermore, attention must be paid to the fact that different device descriptions need to be created for the different field bus systems. Thus, there are e.g. HART-, Fieldbus Foundation- and Profibus-device-descriptions.

In order to create a universal description for field devices, Fieldbus Foundation (FF), HART Communication Foundation (HCF) and Profibus Nutzerorganization (User Organization) (acronym PNO) have defined a universal electronic device description (Electronic Device Description EDD); this is defined in the standard IEC 61804-2.

For comprehensive servicing of field devices, recently, special device descriptions, so-called DTMs (Device Type Managers, or device managers) have become available. These meet the FDT (Field Device Tool) specifications. The FDT specification, serving as an industrial standard, was developed by PNO, in cooperation with ZVEI (Zentralverband Elektrotechnik—und Elektroindustrie, or, in English, German Electrical and Electronics Manufacturers' Association). The up-to-date FDT specification can be obtained from ZVEI, PNO, or the FDT Group.

Many field device manufacturers deliver, along with their field devices, the relevant DTMs. The DTMs include all device-specific data, functions and operational rules, such as e.g. device structure, existing communication options, and a graphical user interface, or GUI, for the particular field device, or for a particular family of field devices.

As run-time environment, DTMs require a frame application, this being, here, the FDT frame. The frame application and the relevant DTMs allow for very comfortable accessing of field devices, e.g. access to device parameters, measured values, diagnostic information, status information, etc., as well as enabling invoking of special functions made available by the particular DTMs. Frame application and DTMs form, together, an object-, or component-, based, management, or configuration, system for field devices. In order that the DTMs of different manufacturers can function correctly in the frame application, the interfaces to the frame application and to the various DTMs must be clearly defined. This matter of interfaces is an FDT concern. The FDT technology unifies the communication interface between field devices and superordinated unit. A special attraction of this technology is that it functions independently of applied communication protocol, software environment, field device, and superordinated unit. FDT technology makes it possible to create a functioning whole out of any combination of field devices, superordinated systems, and protocols. A known FDT frame application is, as already mentioned, FieldCare, a product of the firm, Endress+Hauser.

If a manufacturer has a large number of field device types, particularly field device types for various applications, in its product portfolio, then the DTMs can accumulate to form a significant DTM-library. Usually, these DTM-libraries are so extensive, that the contained data must be stored on a plurality of CDs. With this are associated some essential disadvantages:

1. In order, in the case of a new issue of the library, to load the DTMs onto an FDT frame application, usually installation times up to several hours are required.
2. In order, then, to integrate the new edition of the DTM-library into an FDT frame application, likewise time-consuming installation procedures are necessary, since, first, the already existing DTMs must be deleted and replaced by the improved, new version. If the new installation does not work, then the original version must be re-installed, with much time consumed.
3. Developers of DTM-libraries must, preliminary to an installation, usually perform a plurality of tests with intermediate versions of the DTMs. Also, here, the time-consuming installations are disadvantageous.
4. Usually, in the case of every installation of the DTM-library, changes are performed on the operating system, on which the frame application and the DTM library are stored. These changes remain, even after deinstallation.

5. A fast configuration of the field devices is not possible, since, always, first the DTM-library must be installed. This is especially disadvantageous, when a user would like to implement only one new field device in its plant and must perform the required parametering for the correct operation of the field device. The time for loading the updated DTM-library exceeds, by a number of times, the time for parametering the field device.

SUMMARY OF THE INVENTION

An object of the invention is to provide a method, by which integration or installation of a DTM-library, containing a plurality of device-objects, into an object-based management system is significantly simplified.

The object is achieved by a method, which includes the following method steps:
  storing, as the case may be, updated device objects, or an updated version of a device-objects library, on a physical, storage medium;
  connecting the physical storage medium with a control/display unit, on which a predetermined operating system is running, into which a frame application for the device objects has been bound;
  activating a program, which makes updated device objects stored on the physical storage medium at least partially accessible on the display unit, as soon as the storage medium is connected with the control/display unit; and
  automatically or manually starting a dialog, with which operating personnel can invoke a selected number of device-objects and, via the updated device object, or updated device objects, service a corresponding field device, or corresponding field devices.

An essential advantage of the method of the invention is to be seen in the fact that, for installation of device-object libraries, for integration of updated device-objects into an existing device-object library, and, subsequently, for maintaining the field devices, for which always the updated version of a device object should be available, much time is saved. While, in the case of the known solutions of the state the art, always, with much time consumed, a re-recording of the device-object library, and, on occasion, earlier, a deleting of already present device objects on a computer, must occur, the user can, in the case of application of the method of the invention, without time delay, directly access the updated device objects and directly service the corresponding field device, via the appropriate, updated device object. To be understood as included under the term 'servicing' is, especially, a parametering, or a calibrating, of the field device. In general, it can be said, that the user is provided, via the method of the invention, quasi, with a virtual hard disk containing the updated device-objects.

Other advantages of the method of the invention include the following:
  The version of the device-objects library stored in the superordinated unit, in the form, for example, of a servicing, tool, such as FieldCare, or in the form of a control system, must no longer be replaced in the case of every new version;
  it becomes feasible, preliminarily, during the creation of new device-objects, to test newly created device objects in the frame application during runtime; and
  no changes are made on the operating system.

In an advantageous embodiment of the method of the invention, it is provided that, in the case of a first installation of the updated device objects, or the device-objects library, in an object-based management system, a predetermined communication device object is invoked, or is invokable, as soon as the physical storage medium is connected with the control/display unit. The communication-device object is either stored on a storage medium of the control/display unit or on a separate storage medium connectable with the control/display unit and is preferably automatically activated, as soon as the storage medium is connected with the control/display unit.

Furthermore, it is provided, that, in the case of an already accomplished first-installation of the device objects, or the device-objects library, in the control/display unit, for purposes of a re-installation of a device-objects library containing, at least partially, updated and/or supplemented device-objects, the corresponding non-updated device objects stored in the control/display unit are deleted, or otherwise unbound, and the operating system, for the purpose of servicing at least one selected field device, accesses the updated or supplemented device object stored on the external storage medium.

An advantageous embodiment provides, that, after terminating a servicing procedure, or servicing procedures, the external physical storage medium is removed from the control/display unit.

Preferably, the device-object library with the updated device-objects is stored on a USB flash-drive, a hard disk, a field device or a communication-hardware, or generally, on a non-volatile memory element. The above-mentioned storage media, which are forms of bulk memory, are connected, for example, via a USB-port, such as is generally present on computers. USB-equipped components can be connected together during operation, and the connected components and their properties are recognized by the computer automatically.

Furthermore, according to an advantageous embodiment of the apparatus of the invention, it is provided, that the updated device objects are stored, for example, in the form of binary files or memory dumps. Viewed as especially advantageous in connection with the present invention is the case in which the frame application is an FDT frame application. As already mentioned, FDT unifies the communication interface between field devices and superordinated systems. A special attraction of this technology is that it functions independently of applied communication protocol, software environment, field device, and superordinated unit. FDT technology makes it possible to access and service field devices via any superordinated systems using any protocols.

Preferably, a Windows runtime environment is used as operating system in connection with the method of the invention. It is understood, however, that the method of the invention is not limited by explicitly named embodiments.

In an advantageous embodiment of the method of the invention, it is provided, that a plurality of versions of device-object libraries are stored on the external storage medium, wherein, automatically or manually, a dialog is started, with which operating personnel can invoke a desired version of the device-object libraries, and wherein, via the updated device object, or the updated device objects, of the selected version of device-object libraries, the corresponding field device, or corresponding field devices, is/are serviced.

On the basis of this embodiment, it is possible to jump back and forth between different versions of device-object libraries, without a need for time-consuming installation- and deinstallation-processes. Furthermore, it is then possible, without extra effort, to perform tests with intermediate versions during the developmental phase. In such tests, a comparison is regularly made, whether and how the behavior of the field devices has changed, as between the old and the updated versions of the device objects. Without problem, in the case of malfunction, again, the old version of a device object can be accessed. The user has further, or alternatively, also the opportunity of keeping the new versions of device-objects or removing the old ones.

BRIEF DESCRIPTION OF THE DRAWINGS

The invention will now be explained in greater detail on the basis of the drawing, the figures of which show as follows.

DETAILED DISCUSSION

Figure 1:
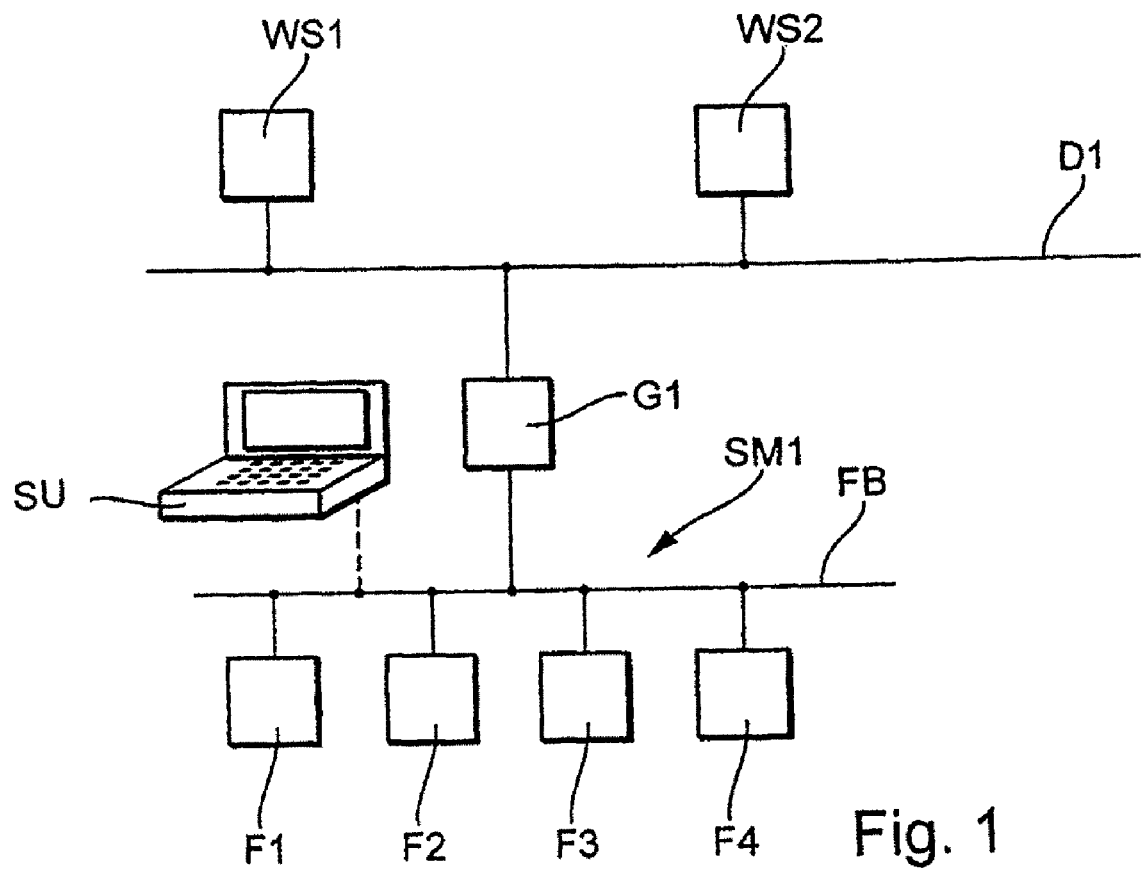
FIG. 1 a schematic drawing of a communication network in automation technology.

FIG. 1 shows, schematically, a communication network KN, such as is applied for process automation. Connected to a data bus D1 are a number of computer units (workstations, host-computer) WS1, WS2. These computer units WS1, WS2 serve as superordinated units (control system, control unit, servicing station, or unit, SU) for process visualizing, process monitoring and for engineering, as well as also for servicing and monitoring of field devices F1, F2, . . . .

Data bus D1 works e.g. according to the Profibus® DP-standard, the HSE (High Speed Ethernet)-standard of Foundation® Fieldbus, the HART-standard, or one of the known standards usable in automation technology. Via a gateway G1, which is also referred to as a linking device or a segment coupler, data bus D1 is connected with a fieldbus segment SM1. Fieldbus segment SM1 is composed of a plurality of field devices F1, F2, which are connected with one another via a fieldbus FB. The field devices F1, F2, . . . are sensors and/or actuators. A portable computer unit SU, e.g. a laptop, can also be temporarily connected with the fieldbus FB for providing e.g. operating personnel access to individual field devices F1, F2, . . . .

Figure 2:
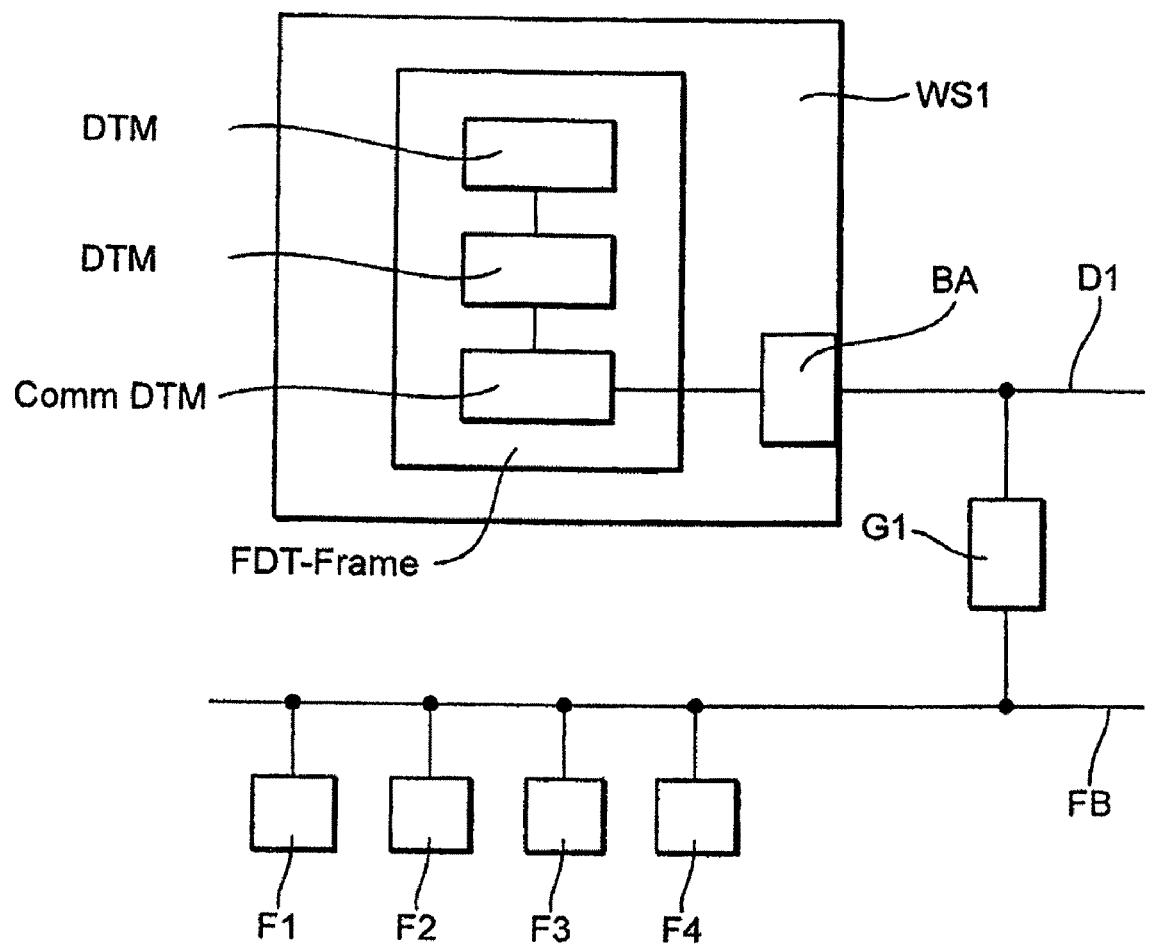
FIG. 2 a schematic drawing of a communication network for interacting with field devices via a servicing program.

FIG. 2 is a schematic representation of a servicing program, which can run on one of the computer units WS1, WS2 or on the service unit SU. The servicing program can be e.g. the servicing software PACTware of the PACTware Consortium e.V. or FieldCare® of the firm, Endress+Hauser®. Both require, as operating system, Microsoft 98NT, 2000. The frame application, FDT-Frame is responsible, especially, for managing the device managers DTM1, DTM2, . . . in a project database, for bus system communication and for managing the device catalog or the device-objects library DoL.

Integrated in the frame-application, FDT frame, are device objects DTM1, DTM2, or device drivers, for a plurality of different field devices F1, F2, . . . . For the purpose of avoiding clutter, only two device objects, namely the device objects DTM1 and DTM2, as well as a communication-DTM, CommDTM, are shown in FIG. 2. As already stated, the device object, or the device manager, DTM1 encapsulates, for instance, all information for the servicing of field device F1. With the help of the device managers DTM1, DTM2, a device- and manufacturer-independent servicing of the field devices F1, F2, as well as the establishing of a communication connection CommDTM between the computer unit WS1 and the field devices F1, F2, become possible. For example, a manufacturer-specific, graphical user interface GUI facilitates the accessing by the user of this information. As regards hardware, the connection is established to field device F1 via the bus adapter BA, the data bus D1, the gateway G1 and the fieldbus FB.

Figure 3:
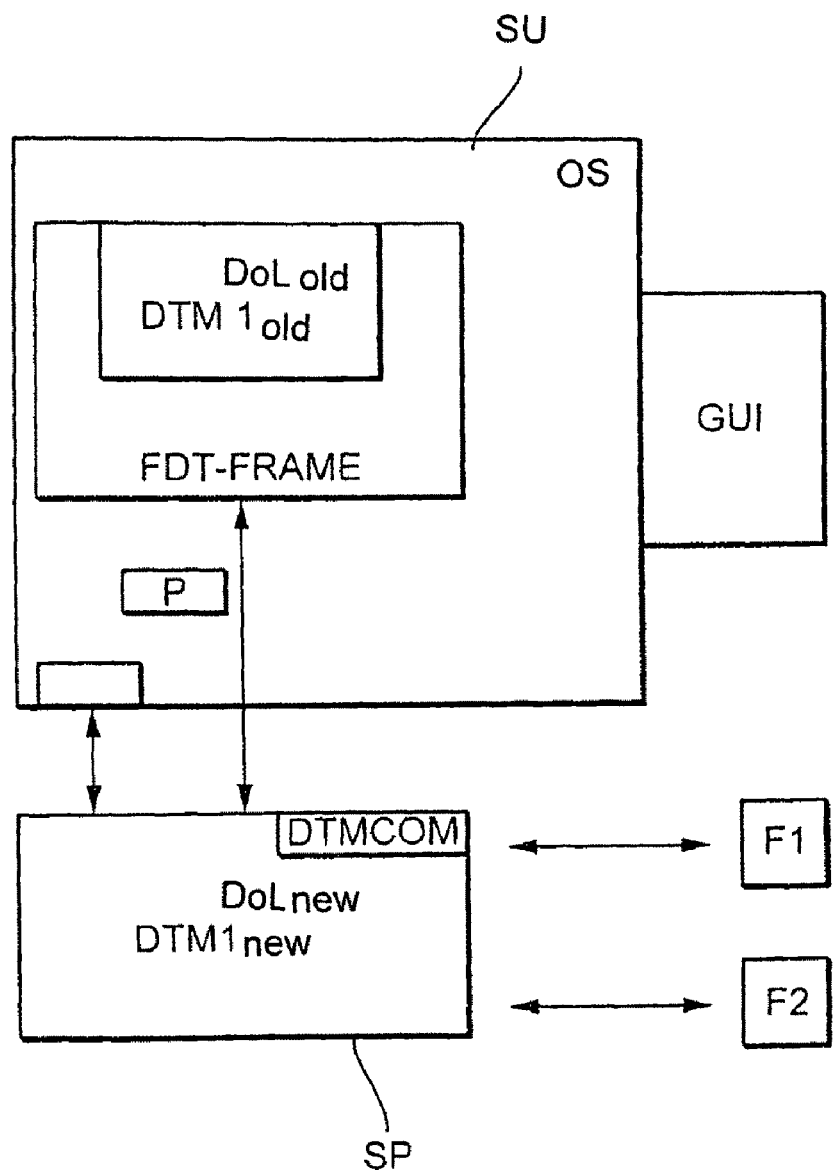
FIG. 3 a schematic drawing of individual components suitable for performing the method of the invention.

FIG. 3 shows a schematic drawing of individual components needed for performing the method of the invention for installation or integration of updated device-objects DTM1new, DTM2new, . . . in an object-based, management system WS1, WS2, SU for field devices F1, F2, . . . in automation technology. The object-based, management system is, for example, the FieldCare servicing tool, which runs on a computer, preferably a laptop. Accessing and servicing of the field devices F1, F2, . . . is accomplished via the device objects DTM1, DTM2, . . . or via the device managers. The, in each case, updated device objects DTM1new, DTM2new, . . . or the updated version of a device-objects library DoLnew, are/is stored on a physical storage medium SM. The physical storage medium SM is connected with the control/display unit WS1, WS2, SU, on which a predetermined operating system OS is running, in which a frame application, FDT-FRAME, for the device objects DTM1, DTM2, . . . is bound. As soon as the physical storage medium SM is connected with the control/display unit WS1, WS2, SU, a program P is activated, which makes the updated device objects DTM1new, DTM2new, . . . stored on the physical storage medium SM at least partially accessible on the display unit GUI. Automatically, or manually, then there is started, on the control/display unit WS1, WS2, SU, a dialog, with which operating personnel can invoke a selected number of device-objects DTM1new, DTM2new, . . . and, via the updated device object, or updated device objects, DTM1new, DTM2new, . . . , invoke and service the corresponding field device, or corresponding field devices, F1, F2, . . . . If there is stored on the control/display unit W1, WS2, SU already an old version DTM1old, DTM2old, . . . of a corresponding device object, then, according to an advantageous embodiment of the invention for servicing of the field device F1, F2, . . . , in each case, the old version DTM1old, DTM2old, . . . of the device object is deleted, or otherwise unbound, and the new version DTM1new, DTM2new, . . . of the device object is accessed.

If a first installation of the updated device objects DTM1new, DTM2new, . . . , or the device-objects library DoLnew, is made into the object-based, management system, or into the control/display unit, WS1, WS2, SU, then a predetermined communication device object DTMCOM is invoked, as soon as the physical storage medium SM is connected with the control/display unit WS1, WS2, SU. In turn, the desired field devices F1, F2, . . . are accessed via the associated device objects or device managers DTM1, DTM2, . . . ; the servicing of the field devices F1, F2, . . . is accomplished according to the invention via the updated version of the device-manager, or the device object, DTM1, DTM2, . . . .

If the storage medium SM, which is preferably a USB flash-memory, is removed from the control/display unit WS1, WS2, SU, no traces thereof are left in the operating system OS of the control/display unit WS1, WS2, SU.

Figure 4:
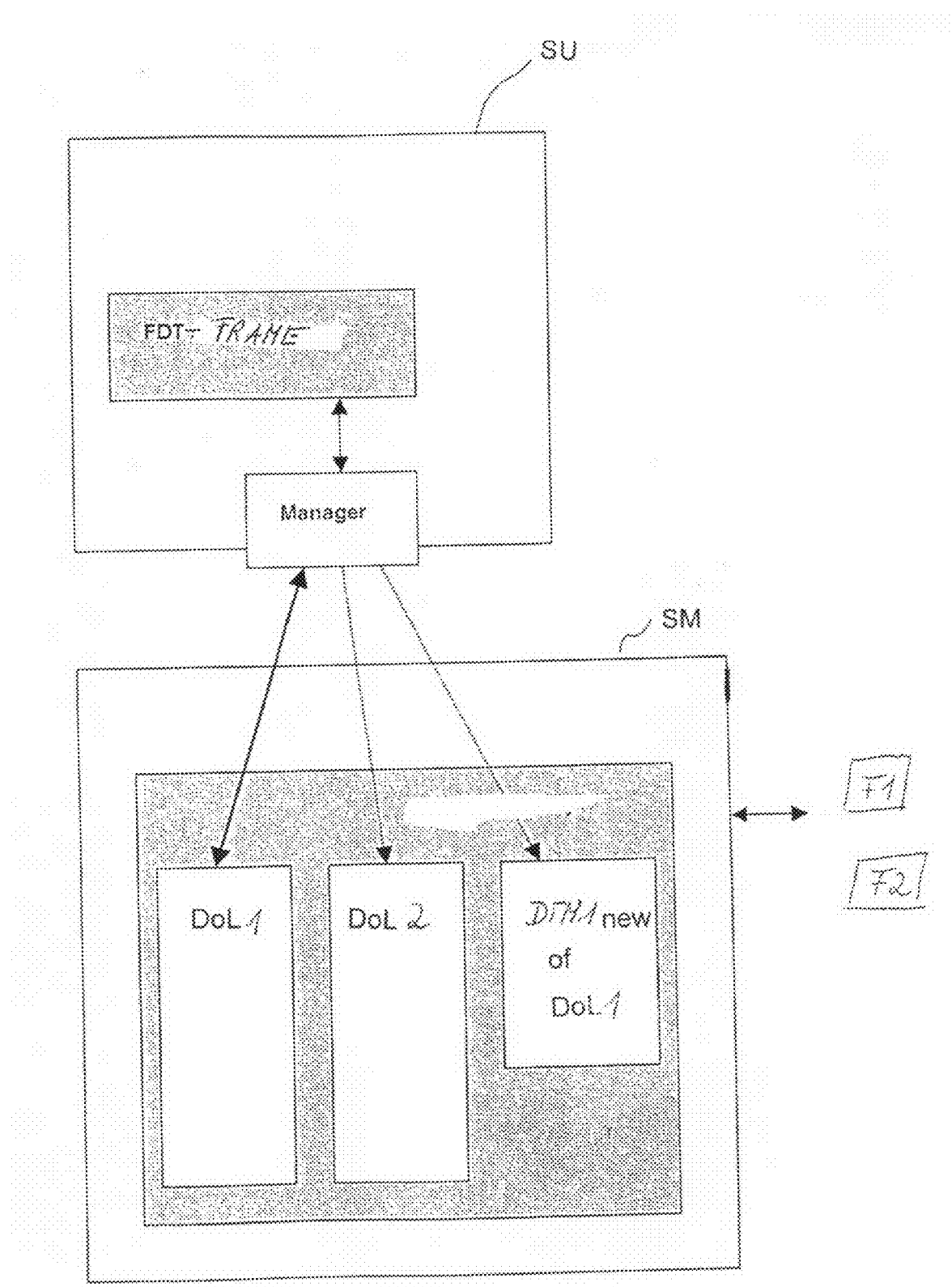
FIG. 4 a schematic drawing of how, according to an advantageous embodiment of the method of the invention, different versions of device-object libraries can be accessed.

FIG. 4 shows a schematic drawing of how, according to an advantageous embodiment of the method of the invention, different versions of device-object libraries DoL1, DoL2 can be accessed. A plurality of versions of device-object libraries DoL1, DoL2 are stored on an external storage medium SM. Accessing of the different versions DoL1, DoL2 is accomplished via a manager, which is associated with the service unit SU. The frame application, FDT frame, is installed on the service unit SU.

This embodiment permits accessing of different versions of device-object libraries DoL1, DoL2, DoL3, without the need for performing time-consuming installations. Furthermore, operating personnel can choose between different versions of device-object libraries DoL1, DoL2, DoL3 or device-objects DTM1new, DTM1old. Via the selected device object DTM1new of the device-object library DoL3, access is then made to the corresponding field device F1. In this way, version management of device-object libraries DoL1, DoL2 or device-objects DTM1new, DTM1old is greatly simplified.

The invention claimed is:

1. A method for integrating device-objects into an object-based, management system for field devices in automation technology, wherein the device objects are used for servicing the field devices, comprising the steps of:
   storing an updated version of a device-objects library on a separate physical storage medium;
   connecting the physical storage medium with a control/display unit on which a predetermined operating system is running, into which a frame application for the device objects has been bound;
   activating a program, which makes the updated device objects stored on the physical storage medium at least partially accessible on the display unit, as soon as the storage medium is connected with the control/display unit;
   automatically or manually starting a dialog, with which operating personnel can invoke a selected number of updated device-objects and, via the updated device object, or the updated device objects, can service a corresponding field device, or corresponding field devices
   servicing the field device by the corresponding updated device object; and,
   removing the separate physical storage medium from the control/display unit after terminating a desired servicing procedure.

2. The method as claimed in claim 1, wherein:
   in a first installation of the updated device objects, or the device-objects library, into an object-based management system, a predetermined communication device object is invokable, as soon as the physical storage medium is connected with the control/display unit.

3. The method as claimed in claim 1, wherein:
   in an already accomplished, first-installation of the device objects, or the device-objects library, in the control/display unit, for purposes of a re-installation of a device-objects library with at least partially updated and/or supplemented device-objects, the corresponding, non-updated device objects stored in the control/display unit are deleted or otherwise unbound; and
   the operating system, for the purpose of servicing of at least one selected field device, accesses the updated or supplemented device object stored on the external storage medium.

4. The method as claimed in claim 1, wherein:
   after terminating a desired servicing procedure, or desired servicing procedures, the external storage medium is removed from the control/display unit.

5. The method as claimed in claim 1, wherein:
   the updated device objects are stored on a USB flash-memory, a hard disk, a field device or a communication-hardware.

6. The method as claimed in claim 1, wherein:
   an FDT frame application is applied as frame application.

7. The method as claimed in claim 1, wherein:
   a Windows runtime environment is applied as operating system.

8. The method as claimed in claim 1, wherein:
   a plurality of versions of device-object libraries are stored on the external storage medium;
   a dialog is started, automatically or manually, with which operating personnel can invoke a desired version of the device-object libraries, and
   via the updated device object, or the updated device objects, of the selected version of device-object libraries, a corresponding field device, or corresponding field devices, is/are serviced.

9. The method as claimed in claim 2, wherein:
   the communication device object is stored on a storage medium of the control/display unit or on a separate storage medium connectable with the control/display unit.

10. The method as claimed in claim 5, wherein:
    the updated device objects are stored as binary files or memory dumps.

* * * * *